US010437742B2

(12) United States Patent
Bhesania et al.

(10) Patent No.: US 10,437,742 B2
(45) Date of Patent: Oct. 8, 2019

(54) VENDOR-SPECIFIC PERIPHERAL DEVICE CLASS IDENTIFIERS

(71) Applicant: Microsoft Technology Licensing, LLC, Redmond, WA (US)

(72) Inventors: Firdosh Kersy Bhesania, Kirkland, WA (US); Arvind R. Aiyar, Redmond, WA (US); Tommy T. Nguyen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/512,033

(22) Filed: Oct. 10, 2014

(65) Prior Publication Data

US 2016/0103771 A1 Apr. 14, 2016

(51) Int. Cl.
*G06F 13/42* (2006.01)
*G06F 13/10* (2006.01)
(Continued)

(52) U.S. Cl.
CPC ............ *G06F 13/10* (2013.01); *G06F 9/4411* (2013.01); *G06F 9/44505* (2013.01); *G06F 13/102* (2013.01)

(58) Field of Classification Search
CPC ...... G06F 13/423; G06F 13/10; G06F 9/4408; G06F 9/4411; G06Q 20/20
(Continued)

(56) References Cited

U.S. PATENT DOCUMENTS 5,875,350 A * 2/1999 Comp ................. G06F 13/4265
710/105
5,890,014 A * 3/1999 Long ...................... G06F 13/10
703/13
(Continued)

FOREIGN PATENT DOCUMENTS

CN 101675419 A 3/2010
CN 102067066 A 5/2011

OTHER PUBLICATIONS

"Bus Agnostic Drivers (Windows CE 5.0)", Retrieved From: <http://msdn.microsoft.com/en-us/library/ms891009.aspx> Oct. 5, 2014, 2006, 1 page.
(Continued)

*Primary Examiner* — Farley Abad
*Assistant Examiner* — Henry W Yu
(74) *Attorney, Agent, or Firm* — Newport IP, LLC; Jacob P. Rohwer (57) ABSTRACT

A peripheral device class identifier is generated for a class of peripheral devices, and is used to identify a setup record that indicates how to install or otherwise set up the class of peripheral devices on a computing device. The peripheral device class identifier is a combination of three components: a vendor identifier, a namespace identifier, and a namespace entry identifier. The vendor identifier is an identifier of the vendor of the class of peripheral devices. The namespace identifier is an identifier of different collections or groups of types of peripheral devices or types of functionality of peripheral devices. The namespace entry identifier is an identifier of a particular type of peripheral device (or particular functionality) of the different collections or groups of types of peripheral devices (or types of functionality of peripheral devices).

20 Claims, 5 Drawing Sheets

(51) Int. Cl.
*G06F 9/4401* (2018.01)
*G06F 9/445* (2018.01)

(58) Field of Classification Search
USPC .................. 710/1, 10, 8, 14; 713/1; 253/383
See application file for complete search history.

(56) References Cited

U.S. PATENT DOCUMENTS

| | | | | |
|---|---|---|---|---|
| 5,974,474 | A * | 10/1999 | Furner | G06F 13/10 710/10 |
| 7,480,740 | B1 * | 1/2009 | Saxena | G06F 9/4411 710/10 |
| 7,716,382 | B2 | 5/2010 | Smith, IV et al. | |
| 7,802,022 | B2 | 9/2010 | Bhesania | |
| 8,132,186 | B1 | 3/2012 | Okcu et al. | |
| 8,463,951 | B1 * | 6/2013 | Priem | G06F 9/4411 710/10 |
| 8,554,957 | B1 * | 10/2013 | Wieland | G06F 9/4411 710/8 |
| 8,825,909 | B1 | 9/2014 | Delco | |
| 2002/0083228 | A1 | 6/2002 | Chiloyan | |
| 2003/0078980 | A1 * | 4/2003 | Carstens | G06Q 10/00 709/206 |
| 2004/0003135 | A1 * | 1/2004 | Moore | G06F 9/4411 719/321 |
| 2004/0064594 | A1 * | 4/2004 | Pooni | G06F 13/423 710/1 |
| 2004/0193860 | A1 * | 9/2004 | Rothman | G06F 9/4411 713/1 |
| 2005/0006468 | A1 * | 1/2005 | Fandel | G06Q 20/20 235/383 |
| 2006/0147235 | A1 | 7/2006 | Sadovsky et al. | |
| 2006/0282652 | A1 * | 12/2006 | El-Haj-mahmoud | G06F 9/4408 713/1 |
| 2007/0294430 | A1 * | 12/2007 | Narayanan | G06F 11/006 709/245 |
| 2008/0126628 | A1 * | 5/2008 | Mullis | G06F 9/4411 710/63 |
| 2008/0276012 | A1 | 11/2008 | Mesa et al. | |
| 2009/0319694 | A1 * | 12/2009 | Slezak | G06F 3/038 710/10 |
| 2010/0174834 | A1 * | 7/2010 | Lowe | G06F 8/60 710/14 |
| 2012/0137312 | A1 | 5/2012 | Asahara | |
| 2012/0239800 | A1 | 9/2012 | Matichuk | |
| 2013/0036431 | A1 * | 2/2013 | Douceur | G06F 9/4411 719/327 |
| 2013/0080662 | A1 * | 3/2013 | Bourque | G09G 5/006 710/10 |
| 2014/0075053 | A1 | 3/2014 | Kolathur et al. | |

OTHER PUBLICATIONS

"Hardware ID", Retrieved from >>http://msdn.microsoft.com/en-us/library/windows/hardwarel/f546152(v=vs.85).aspx>> on Sep 26, 2014, 1 page.
"HID Usages", Retrieved From <<http://msdn.microsoft.com/en-us/library/windows/hardware/ff539946(v=vs.85).aspx>> on Sep. 26, 2014, 1 page.
"Universal Serial Bus (USB) HID Usage Tables Version 1.12", 1996-2004 USB Implementers' Forum, Oct. 28, 2014, 168 pages.
"WinUSB (Winusb.sys) Installation", Retrieved From: <http://msdn.microsoft.com/en-in/library/windows/hardware/ff540283(v=vs.85).aspx> Oct. 5, 2014, 6 pages.
"Second Written Opinion Issued in PCT Application No. PCT/US2015/054106", dated Apr. 28, 2016, 6 Pages.
"International Search Report and Written Opinion", Application No. PCT/US2015/054106, dated Dec. 23, 2015, 11 pages.
"International Preliminary Report on Patentability Issued in PCT Application No. PCT/US2015/054106", dated Jul. 22, 2016, 7 Pages.
"Office Action Issued in Chinese Patent Application No. 201580054936.5", dated Feb. 19, 2019, 12 Pages.
"Office action Issued in European Patent Application No. 15787746.5", dated Apr. 10, 2019, 6 pages.

* cited by examiner

VENDOR-SPECIFIC PERIPHERAL DEVICE CLASS IDENTIFIERS

BACKGROUND

As computing technology has advanced, a large number of different peripheral devices have become available for use with computing devices. These peripheral devices have different hardware identifiers that allow them to be distinguished from one another. Each peripheral device has its own hardware identifier, allowing the correct setup to be performed on a computing device for that peripheral device, such as installing or otherwise accessing software needed to use the peripheral device. This can be problematic for peripheral device vendors because it requires the peripheral device vendor to update their software package (e.g., drivers, installers, etc.) with a new hardware identifier per package, along with the cost of retesting, recertification, and distribution of their software package.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a vendor identifier that identifies a vendor of a class of peripheral devices is obtained, a namespace identifier that identifies a collection of types of peripheral devices is obtained, and a namespace entry identifier that identifies at least one of a particular type of peripheral devices or a particular functionality of peripheral devices is obtained. A peripheral device class identifier is generated based on the vendor identifier, the namespace identifier, and the namespace entry identifier, and the peripheral device class identifier is associated with a setup record for the peripheral device in response to determining that the peripheral device has properties corresponding to the vendor identifier, the namespace identifier, and the namespace entry identifier.

In accordance with one or more aspects, in a computing device and for a peripheral device, a vendor identifier that identifies a vendor of a class of peripheral devices that includes the peripheral device is obtained, a namespace identifier that identifies a collection of types of peripheral devices that includes a type of the peripheral device is obtained, and a namespace entry identifier that identifies at least one of a particular type of peripheral devices that is a particular type of the peripheral device or a particular functionality of the peripheral devices that is a particular functionality of the peripheral device is obtained. A peripheral device class identifier is generated for the peripheral device based on the vendor identifier, the namespace identifier, and the namespace entry identifier, and the peripheral device class identifier is used to identify a setup record for the peripheral device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Vendor-specific peripheral device class identifiers are discussed herein. A peripheral device class identifier is generated for a class of peripheral devices. The peripheral device class identifier can be associated with (e.g., included in) a setup record used to install or otherwise set up the peripheral devices. The setup record can identify, for example, one or more drivers (e.g., software drivers) to install on a computing device to allow the computing device to use the peripheral devices. When a peripheral device is connected to a computing device, the computing device also generates the peripheral device class identifier for the peripheral device and obtains as the setup record for the peripheral device the setup record that is associated with the peripheral device class identifier.

The peripheral device class identifier is made up of three components: a vendor identifier, a namespace identifier, and a namespace entry identifier. These three components are combined (e.g., concatenated together) to generate the peripheral device class identifier. The vendor identifier is an identifier of the vendor of the peripheral devices in the class. The namespace identifier is an identifier of different collections or groups of types of peripheral devices or types of functionality of peripheral devices. For example, the collection or group of different types of uses may be generic desktop controls, game controls, and so forth. The namespace entry identifier is an identifier of a particular type of peripheral device or particular functionality of the different collections or groups of types of peripheral devices or types of functionality of peripheral devices. For example, the collection or group of different types of uses may be generic desktop controls, and the specific use may be a keyboard.

The peripheral device class identifier identifies a class of peripheral devices, and thus can (and typically does) correspond to multiple different peripheral devices. For example, a vendor may build 25 different peripheral devices (e.g., keyboards or game controllers) that vary slightly, and the vendor may further create a single driver that is used for each of the 25 different peripheral devices and a single setup record that identifies the driver. The same peripheral device class identifier is used for all 25 different peripheral devices. Each of the 25 different peripheral devices correspond to the same peripheral device class identifier, advantageously allowing the same setup record and the same driver to be used for all 25 different peripheral devices.

The techniques discussed herein allow a peripheral device vendor to group a collection of their peripheral devices together and maintain compatibility by providing an identifier of the collection of devices. Thus, whenever an update is made to a driver for the collection of peripheral devices, the update is made for all of the devices in the collection of devices.

Figure 1:
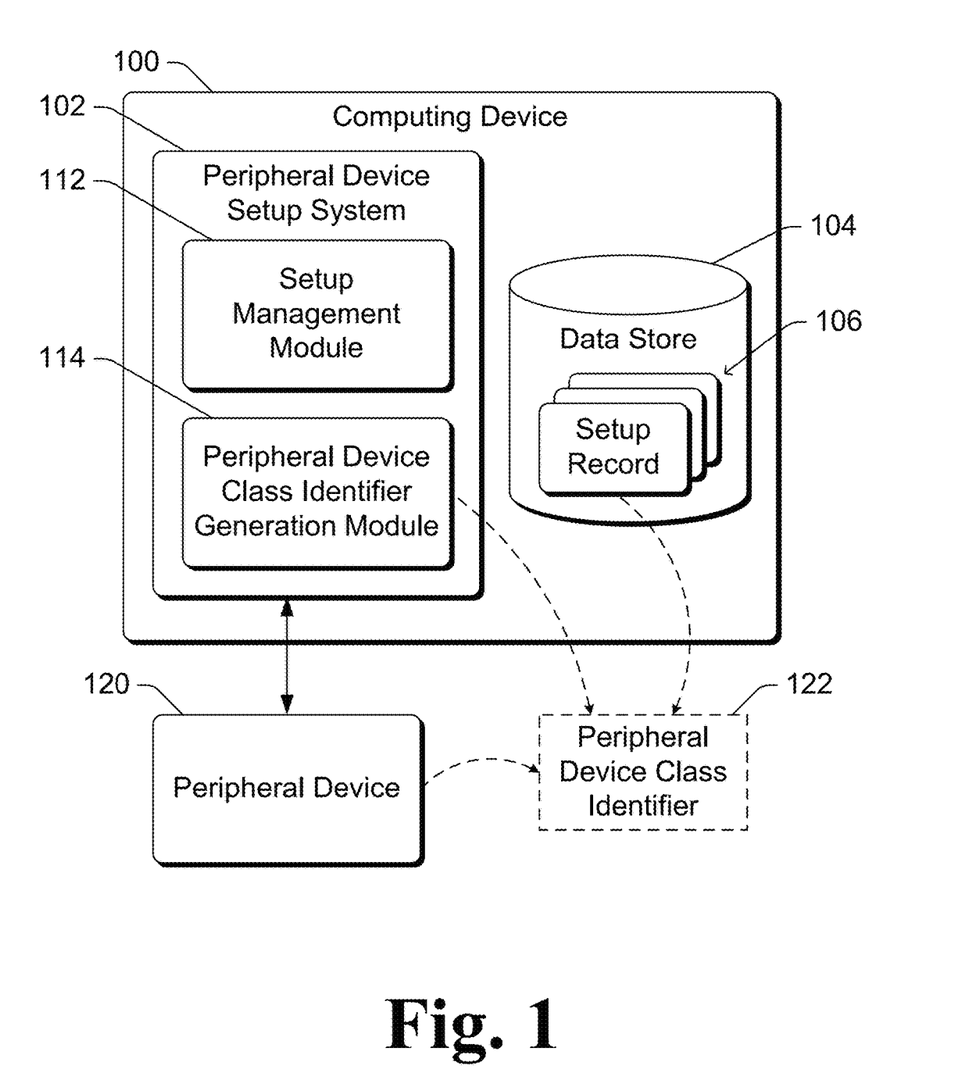
FIG. 1 is a block diagram illustrating an example computing device implementing the vendor-specific peripheral device class identifiers in accordance with one or more embodiments.

FIG. 1 is a block diagram illustrating an example computing device 100 implementing the vendor-specific peripheral device class identifiers in accordance with one or more embodiments. Computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, a watch), an entertainment device (e.g., an entertainment appliance, a set-top box communicatively coupled to a display device, a game console), a television or other display device, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

The computing device 100 includes a peripheral device setup system 102 and a data store 104. The data store 104 includes one or more setup records 106, each setup record 106 including information describing how to install or otherwise set up or use a peripheral device on the computing device 100. The setup record 106 can be a file (e.g., an information or INF) file, can be a portion of a file, can be an element of a database, and so forth. Various information can be included in the setup record 106, such as a name and a location of one or more drivers for the peripheral device, an identification of a version of a driver for the peripheral device, information to be added to a registration store (e.g., an operating system registry or other store of configuration data for the computing device 100), and so forth. In one or more embodiments the setup record 106 identifies a location where one or more drivers of the peripheral device are stored, although alternatively the setup record 106 can include at least part of one or more drivers of the peripheral device.

The peripheral device setup system 102 includes a setup management module 112 and a peripheral device class identifier generation module 114. The setup management module 112 manages the setting up of peripheral devices for use with the computing device 100. This setting up refers to configuring the computing device 100 as appropriate so that the computing device 100 can communicate with the peripheral device. This setting up can include installing on the computing device 100 one or more drivers (e.g., software drivers) for the peripheral devices, setting configuration values (e.g., in a registration store) on the computing device 100 for the peripheral devices, notifying other components or modules of the computing device 100 of the presence of the peripheral devices, and so forth.

The peripheral device class identifier generation module 114 generates peripheral device class identifiers for the peripheral devices. These peripheral device class identifiers include a vendor identifier, a namespace identifier, and a namespace entry identifier as discussed in more detail below. These peripheral device class identifiers each identify a particular class of peripheral devices, and thus correspond to multiple different peripheral devices.

An association is also maintained (e.g., by the computing device 100) between a peripheral device and the setup record 106 that describes how to set up the computing device 100 to use the peripheral device. This association is maintained using the peripheral device class identifier. The peripheral device is identified by the peripheral device class identifier, and a correspondence between the peripheral device class identifier and the setup record that describes how to setup the computing device 100 to use the identified peripheral device is maintained. In one or more embodiments, this correspondence is maintained by including the peripheral device class identifier in the setup record 106, so each setup record 106 includes the peripheral device class identifier of the class of peripheral devices that the setup record 106 describes how to set up. Alternatively, the correspondence can be maintained in different manners, such as by maintaining a list or other record mapping peripheral device class identifiers to setup records 106, using the peripheral device class identifiers as the file names or element names of setup records 106, and so forth.

In one or more embodiments, peripheral device setup system 102 is part of an operating system of the computing device 100. Alternatively, the peripheral device setup system 102, or parts of the peripheral device setup system 102, can be implemented as other components or modules separate from the operating system of the computing device 100.

An example peripheral device 120 is illustrated as being coupled to the computing device 100. The peripheral device 102 can be coupled to the computing device 100 using any of a variety of different wireless or wired communication connections implementing various different protocols. These communication connections can be public and/or proprietary connections. For example, the peripheral device 102 can be coupled to the computing device 100 via a USB (universal serial bus) connection, a wireless USB connection, an infrared connection, a Bluetooth connection, a DisplayPort connection, a PCI (a peripheral component interconnect) Express connection, a data network connection (e.g., a Wi-Fi network connection), and so forth.

The peripheral device 120 has a peripheral device class identifier 122 that identifies the class of peripheral device 120. The class of the peripheral device 120 refers to a collection or group of peripheral devices of which the peripheral devices 120 is a part. The vendor of the peripheral device 120 defines the collection or group of peripheral devices, and thus defines which class the peripheral device 120 is part of. This defining of which class the peripheral device 120 is part of is based on various properties or characteristics of the peripheral device 120.

The peripheral device 120 includes (e.g., in one or more registers of the peripheral device 120) the components of the peripheral device class identifier 122, or other information from which the components of the peripheral device class identifier 122 can be determined. When the peripheral device 120 is situated so as to be connected to the computing device 100 (e.g., attached via a cable for a wired connection, within wireless range of a wireless connection, coupled to a same data network as), the setup management module 112 detects the presence of the peripheral device 120 in any of a variety of different public or proprietary manners. In response to the presence of the peripheral device 120 being detected, the peripheral device class identifier generation module 114 generates the peripheral device class identifier 122, and uses the peripheral device class identifier 122 to identify the setup record 106 corresponding to the peripheral device 120. The peripheral device class identifier generation module 114 provides the peripheral device class identifier to the setup management module 112, allowing the setup management module 112 to setup the computing device 100 to use the peripheral device 122.

The computing device 100 using the peripheral device 122 refers to the computing device 100 communicating with the peripheral device 122. This communication can include transferring data or information to the peripheral device 122 and/or receiving data or information from the peripheral device 122.

Figure 2:
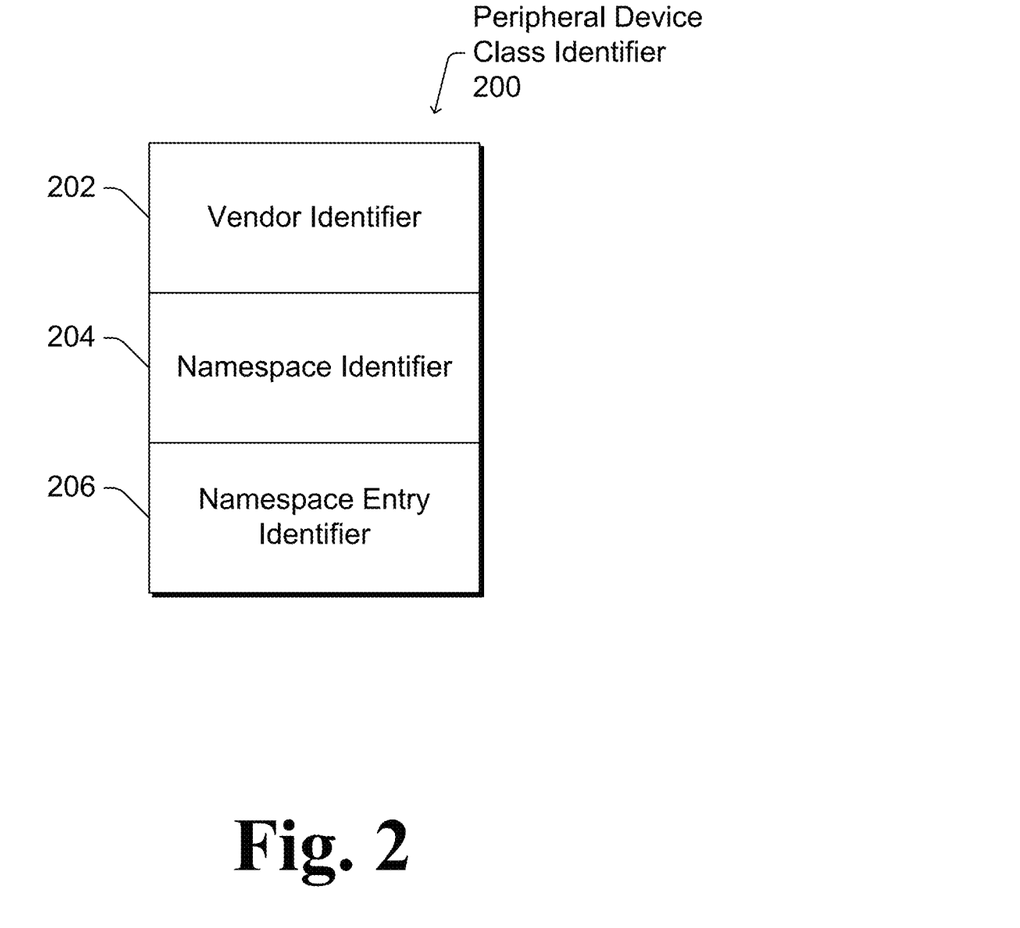
FIG. 2 illustrates an example peripheral device class identifier in accordance with one or more embodiments.

FIG. 2 illustrates an example peripheral device class identifier 200 in accordance with one or more embodiments. The peripheral device class identifier 200 can be, for example, the peripheral device class identifier 122 of FIG. 1. The peripheral device class identifier 200 includes a vendor identifier 202, a namespace identifier 204, and a namespace entry identifier 206.

The vendor identifier 202 is an identifier of the vendor of the class of peripheral devices. The vendor identifier 202 is a string of characters (e.g., alphanumeric characters, punctuation marks) that identifies the vendor (e.g., seller, manufacturer, distributer) of the class of peripheral devices. Different vendors have different vendor identifiers, and a single vendor can have multiple vendor identifiers. A peripheral device includes (e.g., in a register of the peripheral device) the vendor identifier 202 of the class of peripheral devices of which the peripheral device is a part.

The namespace identifier 204 is an identifier of different collections or groups of types of peripheral devices or types of functionality of peripheral devices. The namespace identifier 204 is a string of characters (e.g., alphanumeric characters, punctuation marks) that identifies one of multiple different collections or groups of different types of peripheral devices or types of functionality of peripheral devices. For example, the collection or group of different types of uses may be generic desktop controls, game controls, LEDs, Button, and so forth.

The namespace entry identifier 206 is an identifier of a particular type of peripheral device (or particular functionality) of the different collections or groups of types of peripheral devices (or types of functionality of peripheral devices). The namespace identifier 204 and the namespace entry identifier 206 together provide an indication of the peripheral device and/or the type of functionality provided by the class of peripheral devices. For example, the collections or groups of types of peripheral devices or types of functionality of peripheral devices (as indicated by the namespace identifier 204) may be generic desktop controls, and the particular type of peripheral device or functionality provided by the peripheral device (as indicated by the namespace entry identifier 206) may be a keyboard, a joystick, a keypad, a mouse, and so forth. By way of another example, the collections or groups of types of peripheral devices or types of functionality of peripheral devices (as indicated by the namespace identifier 204) may be game controls, and the particular type of peripheral device or functionality provided by the peripheral device (as indicated by the namespace entry identifier 206) may be 3-dimensional game controller, pinball device, and so forth.

In one or more embodiments, for peripheral devices that are human interface devices (HIDs), the namespace identifier 204 is a usage page identifier, and the namespace entry identifier 206 is a usage identifier. The usage page identifier identifies a usage page of an HID standard or specification (such as the USB HID Usage Tables Specification, Version 1.12, Oct. 28, 2004), and the usage identifier is an identifier of a usage on the identified usage page of an HID standard or specification. Alternatively, for peripheral devices that are USB devices, the namespace identifier 204 is a class identifier, and the namespace entry identifier 206 is a subclass identifier. The class identifier identifies a class of a USB standard or specification (such as the USB Specification, Version 3.1, July 2013), and the subclass is an identifier of a subclass of the identified class of a USB standard or specification.

The vendor identifier 202, the namespace identifier 204, and the namespace entry identifier 206 are combined to generate the peripheral device class identifier 200. In one or more embodiments, this combination is a concatenation of the vendor identifier 202, the namespace identifier 204, and the namespace entry identifier 206. For example, the namespace identifier 204 can be VID-046D, the namespace identifier 204 can be UP:FFBC, and the namespace entry identifier 206 can be U:0088, which are combined to create the peripheral device class identifier 200 of VID_046D&UP: FFBC_U:0088. However, it should be noted that the vendor identifier 202, the namespace identifier 204, and the namespace entry identifier 206 can be concatenated in other orders, and that other manners of combining the vendor identifier 202, the namespace identifier 204, and the namespace entry identifier 206 can alternatively be used.

Figure 3:
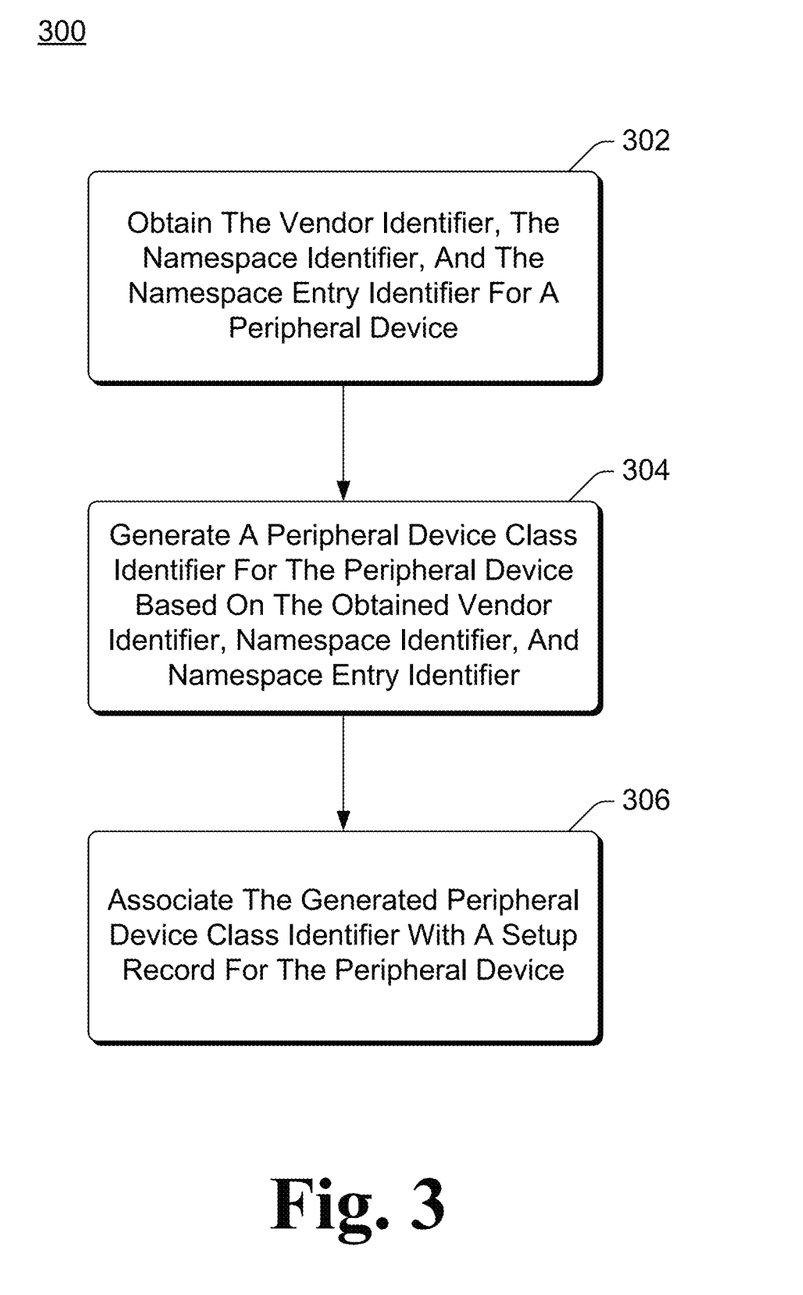
FIG. 3 is a flowchart illustrating an example process for implementing the vendor-specific peripheral device class identifiers in accordance with one or more embodiments.

FIG. 3 is a flowchart illustrating an example process 300 for implementing the vendor-specific peripheral device class identifiers in accordance with one or more embodiments. Process 300 is carried out by a device of a vendor, and can be implemented in software, firmware, hardware, or combinations thereof. Process 300 is shown as a set of acts and is not limited to the order shown for performing the operations of the various acts. Process 300 is an example process for implementing the vendor-specific peripheral device class identifiers; additional discussions of implementing the vendor-specific peripheral device class identifiers are included herein with reference to different figures.

In process 300, the vendor identifier, the namespace identifier, and the namespace entry identifier for a peripheral device are obtained (act 302). These identifiers can be obtained from different sources, such as provided by the vendor, from other devices or components, from industry standard identifier definitions, and so forth.

A peripheral device class identifier is generated for the peripheral device based on the obtained vendor identifier, namespace identifier, and namespace entry identifier (act 304). The peripheral device class identifier is generated by combining the vendor identifier, namespace identifier, and namespace entry identifier in any of various manners as discussed above.

The generated peripheral device class identifier is associated with a setup record for the peripheral device (act 306). This association can be made in various manners as discussed above, such as by including the peripheral device class identifier in the setup record. The peripheral device has properties or characteristics that correspond to, and thus result in association of the peripheral device with, the vendor identifier, namespace identifier, and namespace entry identifier obtained in act 302. The association is thus also made in response to the peripheral device having properties or characteristics that correspond to the obtained vendor identifier, namespace identifier, and namespace entry identifier.

Figure 4:
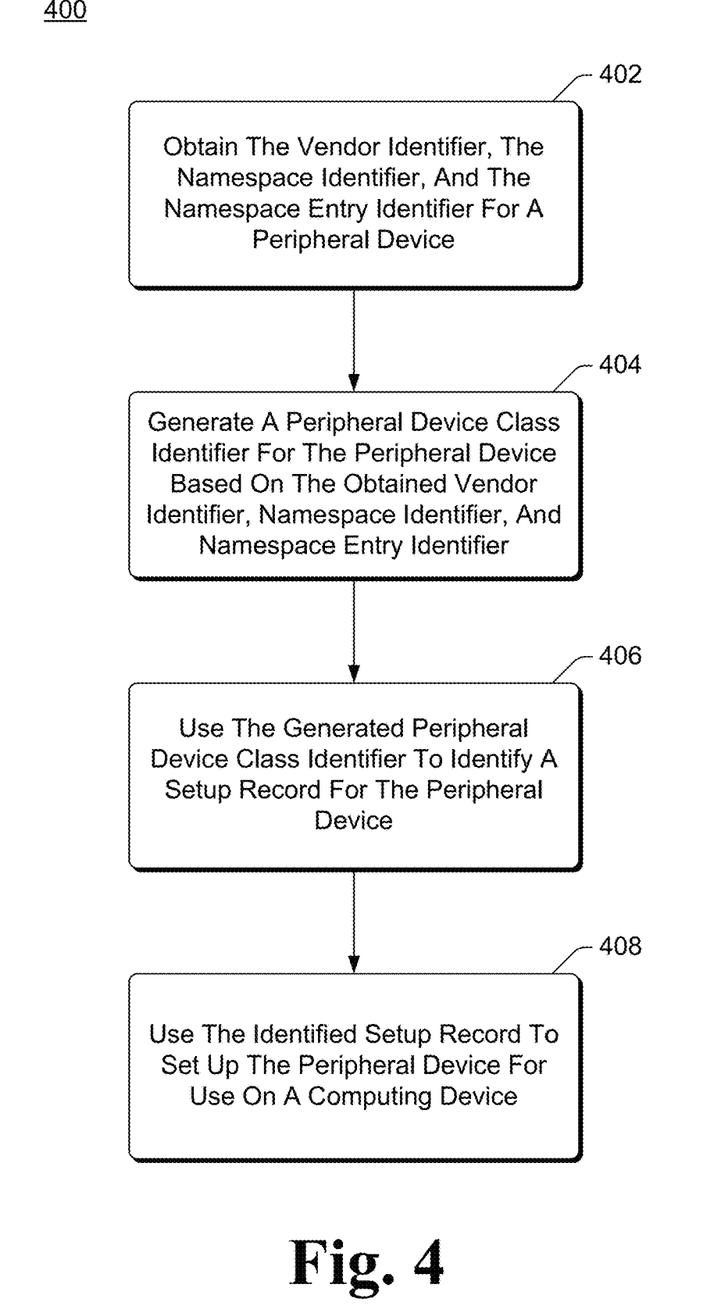
FIG. 4 is a flowchart illustrating another example process for implementing the vendor-specific peripheral device class identifiers in accordance with one or more embodiments.

FIG. 4 is a flowchart illustrating another example process 400 for implementing the vendor-specific peripheral device class identifiers in accordance with one or more embodiments. Process 400 is carried out by a computing device being set up to use a peripheral device, such as the computing device 100 of FIG. 1, and can be implemented in software, firmware, hardware, or combinations thereof. Process 400 is shown as a set of acts and is not limited to the order shown for performing the operations of the various acts. Process 400 is an example process for implementing the vendor-specific peripheral device class identifiers; additional discussions of implementing the vendor-specific peripheral device class identifiers are included herein with reference to different figures.

In process 400, the vendor identifier, the namespace identifier, and the namespace entry identifier for a peripheral device are obtained (act 402). These identifiers are obtained from the peripheral device, such as from registers in the peripheral device as discussed above. Alternatively, one or more of the identifiers can be obtained from different sources. These different sources can be, for example, an administrator or user of the computing device, another component or module of the computing device, another device, and so forth.

A peripheral device class identifier is generated for the peripheral device based on the obtained vendor identifier, namespace identifier, and namespace entry identifier (act 404). The peripheral device class identifier is generated by combining the vendor identifier, namespace identifier, and namespace entry identifier in any of various manners as discussed above. The peripheral device class identifier is generated in act 404 in the same manner as the peripheral device class identifier is generated in act 304 of FIG. 3.

The generated peripheral device class identifier is used to identify a setup record for the peripheral device (act 406). A setup record is associated with the peripheral device class identifier, as discussed above. The manner in which the setup record associated with the peripheral device is identified can vary based on the manner in which the setup record is associated with the peripheral device class identifier. For example, the setup records can be searched to determine which setup record includes the generated peripheral device class identifier, a database or other listing of setup records can be searched to determine which setup record includes or otherwise identifies the generated peripheral device class identifier, and so forth.

The identified setup record is used to set up the peripheral device for use on the computing device (act 408). As discussed above, this setting up includes configuring the computing device to communicate with the peripheral device, and can include installing on the computing device a driver for the peripheral device.

It should be noted that the techniques discussed herein describe a particular type of peripheral device identifier, referred to herein as the peripheral device class identifier. However, various other peripheral device identifiers can also be associated with the peripheral device. For example, the vendor identifier may be combined with (e.g., concatenated with) a product identifier of the particular peripheral device (rather than the namespace identifier and the namespace entry identifier). The product identifier allows the particular peripheral device to be distinguished from other peripheral devices of the vendor. These various other peripheral device identifiers can be associated with the peripheral device concurrently with the peripheral device class identifier being associated with the peripheral device (e.g., a setup record may include both the peripheral device class identifier as well as one or more other peripheral device identifiers, registers of the peripheral device can include information allowing one or more other peripheral device identifiers to be generated as well as the peripheral device class identifier to be generated).

It should also be noted that the techniques discussed herein are described with reference to using the peripheral device with a computing device. These techniques can be used with any device operating as a host device for a peripheral device (e.g., any device to which the peripheral device is connected, whether wirelessly or wired). For example, the techniques discussed herein can be used in a vehicle environment in which the peripheral devices are connected to a vehicle computer. By way of another example, the techniques discussed herein can be used with peripheral devices that are part of an Internet of Things (IoT) environment.

It should also be noted that the techniques discussed herein allow a peripheral device vendor to have a driver for a collection or group of peripheral devices. The driver can be distributed to computing devices using any one or more of a variety of different distribution channels or mechanisms. For example, the driver can be made available on the vendor's Web site or other network location, can be provided as part of an operating system update service (e.g., provided to computing devices by the operating system vendor along with other operating system updates), and so forth.

The techniques discussed herein support a variety of different usage scenarios. For example, if a vendor has 25 different peripheral devices with slight differences between them, the vendor can have a single setup record for all 25 different peripheral devices, the setup record identifying the same driver. The vendor can have all 25 different peripheral devices approved for use by a vendor of a computing device (or operating system) by having the vendor of the computing device (or operating system) approve the single setup record and the single driver. This use of a single setup record and driver for multiple peripheral devices advantageously reduces the number of setup records and drivers included on the computing device (thus reducing the storage space or memory used, and improving computing device performance by reducing the number of setup records that are searched in order to identify the setup record for a particular peripheral device). Furthermore, if the vendor subsequently changes the setup record or driver, only the single setup record or driver need be changed—changes to 25 different setup records or drivers need not be made. In addition, if the vendor creates a new peripheral device, that new peripheral device can advantageously be given the same peripheral device class identifier, allowing the new peripheral device to use the same setup record and driver as was previously approved by the vendor of the computing device (or operating system) and avoiding any need to have the setup record and driver re-approved. Usability of the computing device as well as the peripheral device is thus increased.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
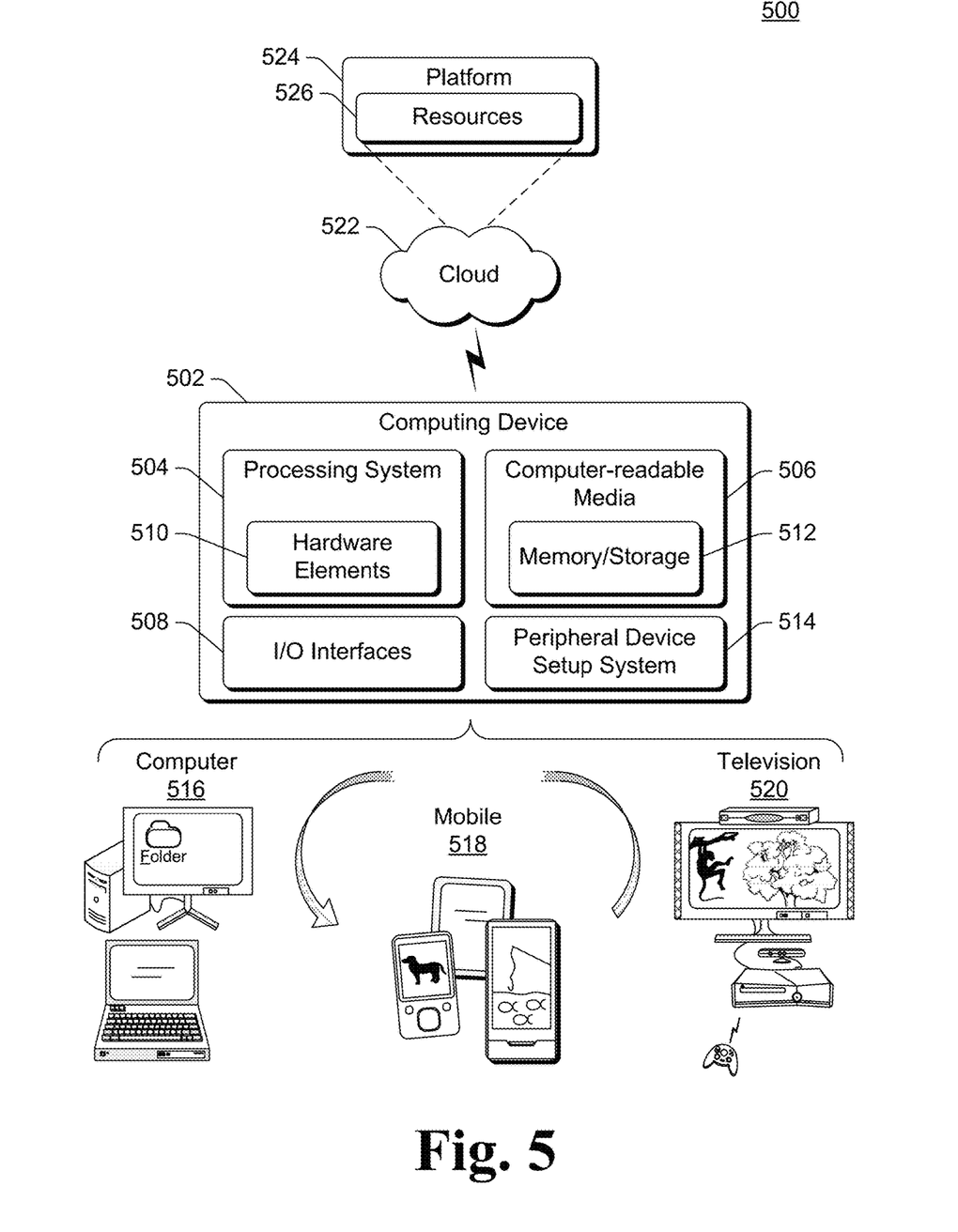
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system. The computing device 502 can be, for example, a computing device 100 of FIG. 1, a computing device implementing the process 300 of FIG. 3, a computing device implementing the process 400 of FIG. 4, and so forth.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a peripheral device setup system 514. The peripheral device setup system 514 can perform one or more of generating a peripheral device class identifier, setting up a computing device to use with a peripheral device, and so forth as discussed above. The peripheral device setup system 514 can implement, for example, the peripheral device setup system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: obtaining each of a vendor identifier that identifies a vendor of a class of peripheral devices, a namespace identifier that identifies a collection of types of peripheral devices, and a namespace entry identifier that identifies at least one of a particular type of peripheral devices or a particular functionality of peripheral devices; generating a peripheral device class identifier based on the vendor identifier, the namespace identifier, and the namespace entry identifier; and associating the peripheral device class identifier with a setup record for a peripheral device in response to determining that the peripheral device has properties corresponding to the vendor identifier, the namespace identifier, and the namespace entry identifier.

Alternatively or in addition to the above described method, any one or combination of: the generating the peripheral device class identifier comprising generating the peripheral device class identifier by combining the vendor identifier, the namespace identifier, and the namespace entry identifier; the combining the vendor identifier, the namespace identifier, and the namespace entry identifier comprising concatenating the vendor identifier, the namespace identifier, and the namespace entry identifier; the peripheral device comprising a universal serial bus device, the namespace identifier comprising a class identifier of the universal serial bus device, and the namespace entry identifier comprising a subclass identifier of the universal serial bus device; the peripheral device comprising a human interface device, the namespace identifier comprising a usage page identifier of the human interface device, and the namespace entry identifier comprising a usage identifier of the human interface device; the associating the peripheral device class identifier with the setup record for the peripheral device comprising including the peripheral device class identifier in the setup record; the setup record comprising an information file describing how to install or use the peripheral device on a computing device; the setup record identifying a driver to install on a computing device to allow the computing device to communicate with the peripheral device.

A method implemented in a computing device, the method comprising: obtaining, for a peripheral device, each of a vendor identifier that identifies a vendor of a class of peripheral devices that includes the peripheral device, a namespace identifier that identifies a collection of types of peripheral devices that includes a type of the peripheral device, and a namespace entry identifier that identifies at least one of a particular type of peripheral devices that is a particular type of the peripheral device or a particular functionality of peripheral devices that is a particular functionality of the peripheral device; generating, for the peripheral device, a peripheral device class identifier based on the vendor identifier, the namespace identifier, and the namespace entry identifier; and using the peripheral device class identifier to identify a setup record for the peripheral device.

Alternatively or in addition to any of the above described methods, any one or combination of: the method further comprising using the setup record to set up the peripheral device for use on the computing device; the using the setup record to set up the peripheral device for use on the computing device comprising installing, on the computing device, a driver identified by the setup record; the generating the peripheral device class identifier comprising generating the peripheral device class identifier by combining the vendor identifier, the namespace identifier, and the namespace entry identifier; the combining the vendor identifier, the namespace identifier, and the namespace entry identifier comprising concatenating the vendor identifier, the namespace identifier, and the namespace entry identifier; the peripheral device comprising a universal serial bus device, the namespace identifier comprising a class identifier of the universal serial bus device, and the namespace entry identifier comprising a subclass identifier of the universal serial bus device; the peripheral device comprising a human interface device, the namespace identifier comprising a usage page identifier of the human interface device, and the namespace entry identifier comprising a usage identifier of the human interface device; the setup record comprising an information file describing how to install or use the peripheral device on a computing device.

A computing device comprising: a processing system comprising one or more processors; and one or more computer-readable storage media having stored thereon multiple instructions that, responsive to execution by the processing system, cause the processing system to perform acts comprising: obtaining, for a peripheral device, each of a vendor identifier that identifies a vendor of a class of peripheral devices that includes the peripheral device, a namespace identifier that identifies a collection of types of peripheral devices that includes a type of the peripheral device, and a namespace entry identifier that identifies at least one of a particular type of peripheral devices that is a particular type of the peripheral device or a particular functionality of peripheral devices that is a particular functionality of the peripheral device; generating, for the peripheral device, a peripheral device class identifier based on the vendor identifier, the namespace identifier, and the namespace entry identifier; using the peripheral device class identifier to identify a setup record for the peripheral device; and using the setup record to set up the peripheral device for use on the computing device.

Alternatively or in addition to the above described computing device, any one or combination of: the using the setup record to set up the peripheral device for use on the computing device comprising installing, on the computing device, a driver identified by the setup record; the peripheral device comprising a human interface device, the namespace identifier comprising a usage page identifier of the human interface device, the namespace entry identifier comprising a usage identifier of the human interface device, the generating the peripheral device class identifier comprising generating the peripheral device class identifier by concatenating the vendor identifier, the usage page identifier, and the usage identifier; the using the peripheral device class identifier to identify the setup record comprising identifying, as the setup record, one of multiple setup records on the computing device, the one of the multiple setup records including the peripheral device class identifier.

A computing device comprising: a processing system comprising one or more processors; and one or more computer-readable storage media having stored thereon multiple instructions that, responsive to execution by the processing system, cause the processing system to perform acts comprising: obtaining, for a peripheral device, each of a vendor identifier that identifies a vendor of a class of peripheral devices that includes the peripheral device, a namespace identifier that identifies a collection of types of peripheral devices that includes a type of the peripheral device, and a namespace entry identifier that identifies at least one of a particular type of peripheral devices that is a particular type of the peripheral device or a particular functionality of peripheral devices that is a particular functionality of the peripheral device; generating, for the peripheral device, a peripheral device class identifier based on the vendor identifier, the namespace identifier, and the namespace entry identifier; and using the peripheral device class identifier to identify a setup record for the peripheral device.

Alternatively or in addition to any of the above described computing devices, any one or combination of: the acts further comprising using the setup record to set up the peripheral device for use on the computing device; the using the setup record to set up the peripheral device for use on the computing device comprising installing, on the computing device, a driver identified by the setup record; the generating the peripheral device class identifier comprising generating the peripheral device class identifier by combining the vendor identifier, the namespace identifier, and the namespace entry identifier; the combining the vendor identifier, the namespace identifier, and the namespace entry identifier comprising concatenating the vendor identifier, the namespace identifier, and the namespace entry identifier; the peripheral device comprising a universal serial bus device, the namespace identifier comprising a class identifier of the universal serial bus device, and the namespace entry identifier comprising a subclass identifier of the universal serial bus device; the peripheral device comprising a human interface device, the namespace identifier comprising a usage page identifier of the human interface device, and the namespace entry identifier comprising a usage identifier of the human interface device; the setup record comprising an information file describing how to install or use the peripheral device on a computing device.

A system or device comprising: means for obtaining each of a vendor identifier that identifies a vendor of a class of peripheral devices, a namespace identifier that identifies a collection of types of peripheral devices, and a namespace entry identifier that identifies at least one of a particular type of peripheral devices or a particular functionality of peripheral devices; means for generating a peripheral device class identifier based on the vendor identifier, the namespace identifier, and the namespace entry identifier; and means for associating the peripheral device class identifier with a setup record for a peripheral device in response to determining that the peripheral device has properties corresponding to the vendor identifier, the namespace identifier, and the namespace entry identifier.

Alternatively or in addition to any of the above described systems or devices, any one or combination of: the means for generating the peripheral device class identifier comprising means for generating the peripheral device class identifier by combining the vendor identifier, the namespace identifier, and the namespace entry identifier; the means for combining the vendor identifier, the namespace identifier, and the namespace entry identifier comprising means for concatenating the vendor identifier, the namespace identifier, and the namespace entry identifier; the peripheral device comprising a universal serial bus device, the namespace identifier comprising a class identifier of the universal serial bus device, and the namespace entry identifier comprising a subclass identifier of the universal serial bus device; the peripheral device comprising a human interface device, the namespace identifier comprising a usage page identifier of the human interface device, and the namespace entry identifier comprising a usage identifier of the human interface device; the means for associating the peripheral device class identifier with the setup record for the peripheral device comprising means for including the peripheral device class identifier in the setup record; the setup record comprising an information file describing how to install or use the peripheral device on a computing device; the setup record identifying a driver to install on a computing device to allow the computing device to communicate with the peripheral device.

A system or device comprising: means for obtaining, for a peripheral device, each of a vendor identifier that identifies a vendor of a class of peripheral devices that includes the peripheral device, a namespace identifier that identifies a collection of types of peripheral devices that includes a type of the peripheral device, and a namespace entry identifier that identifies at least one of a particular type of peripheral devices that is a particular type of the peripheral device or a particular functionality of peripheral devices that is a particular functionality of the peripheral device; means for generating, for the peripheral device, a peripheral device class identifier based on the vendor identifier, the namespace identifier, and the namespace entry identifier; and means for using the peripheral device class identifier to identify a setup record for the peripheral device.

Alternatively or in addition to any of the above described systems or devices, any one or combination of: further comprising means for using the setup record to set up the peripheral device for use on the computing device; the means for using the setup record to set up the peripheral device for use on the computing device comprising means for installing, on the computing device, a driver identified by the setup record; the means for generating the peripheral device class identifier comprising means for generating the peripheral device class identifier by combining the vendor identifier, the namespace identifier, and the namespace entry identifier; the means for combining the vendor identifier, the namespace identifier, and the namespace entry identifier comprising means for concatenating the vendor identifier, the namespace identifier, and the namespace entry identifier; the peripheral device comprising a universal serial bus device, the namespace identifier comprising a class identifier of the universal serial bus device, and the namespace entry identifier comprising a subclass identifier of the universal serial bus device; the peripheral device comprising a human interface device, the namespace identifier comprising a usage page identifier of the human interface device, and the namespace entry identifier comprising a usage identifier of the human interface device; the setup record comprising an information file describing how to install or use the peripheral device on a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    obtaining each of a vendor identifier that identifies a vendor of a class of peripheral devices, a namespace identifier that identifies a collection of types of peripheral devices, and a namespace entry identifier that identifies at least one of a particular type of peripheral devices or a particular functionality of peripheral devices;
    generating a peripheral device class identifier based on the vendor identifier, the namespace identifier, and the namespace entry identifier, the peripheral device class identifier identifying the class of peripheral devices, wherein the peripheral device class identifier corresponds to multiple different peripheral devices within the class of peripheral devices without using product identifiers that distinguish between individual ones of the multiple different peripheral devices;
    associating the peripheral device class identifier with a setup record for a peripheral device in response to determining that the peripheral device has properties corresponding to the vendor identifier, the namespace identifier, and the namespace entry identifier; and
    using the setup record to configure a computing device to communicate with the peripheral device.

2. The method as recited in claim 1, the generating the peripheral device class identifier comprising generating the peripheral device class identifier by combining the vendor identifier, the namespace identifier, and the namespace entry identifier.

3. The method as recited in claim 2, the combining the vendor identifier, the namespace identifier, and the namespace entry identifier comprising concatenating the vendor identifier, the namespace identifier, and the namespace entry identifier.

4. The method as recited in claim 1, the peripheral device comprising a universal serial bus device, the namespace identifier comprising a class identifier of the universal serial bus device, and the namespace entry identifier comprising a subclass identifier of the universal serial bus device.

5. The method as recited in claim 1, the peripheral device comprising a human interface device, the namespace identifier comprising a usage page identifier of the human interface device, and the namespace entry identifier comprising a usage identifier of the human interface device.

6. The method as recited in claim 1, the associating the peripheral device class identifier with the setup record for the peripheral device comprising including the peripheral device class identifier in the setup record.

7. The method as recited in claim 6, the setup record comprising an information file describing how to install or use the peripheral device on the computing device.

8. The method as recited in claim 6, the setup record identifying a driver to install on the computing device to allow the computing device to communicate with the peripheral device.

9. A method implemented in a computing device, the method comprising:
   obtaining, for a peripheral device, each of a vendor identifier that identifies a vendor of a class of peripheral devices that includes the peripheral device, a namespace identifier that identifies a collection of types of peripheral devices that includes a type of the peripheral device, and a namespace entry identifier that identifies at least one of the type of the peripheral device or a particular functionality of peripheral devices that is a particular functionality of the peripheral device;
   generating, for the peripheral device, a peripheral device class identifier based on the vendor identifier, the namespace identifier, and the namespace entry identifier, the peripheral device class identifier identifying the class of peripheral devices, wherein the peripheral class identifier corresponds to multiple different peripheral devices within the class of peripheral devices without using product identifiers that distinguish between individual ones of the multiple different peripheral devices; and
   using the peripheral device class identifier to identify a setup record for the peripheral device, the setup record being used for the class of peripheral devices.

10. The method as recited in claim 9, the method further comprising using the setup record to set up the peripheral device for use on the computing device.

11. The method as recited in claim 10, the using the setup record to set up the peripheral device for use on the computing device comprising installing, on the computing device, a driver identified by the setup record.

12. The method as recited in claim 9, the generating the peripheral device class identifier comprising generating the peripheral device class identifier by combining the vendor identifier, the namespace identifier, and the namespace entry identifier.

13. The method as recited in claim 12, the combining the vendor identifier, the namespace identifier, and the namespace entry identifier comprising concatenating the vendor identifier, the namespace identifier, and the namespace entry identifier.

14. The method as recited in claim 12, the peripheral device comprising a universal serial bus device, the namespace identifier comprising a class identifier of the universal serial bus device, and the namespace entry identifier comprising a subclass identifier of the universal serial bus device.

15. A computing device comprising:
   a processing system comprising one or more processors; and
   one or more computer-readable storage media having stored thereon instructions that, responsive to execution by the processing system, cause the processing system to perform acts comprising:
      obtaining, for a peripheral device, each of a vendor identifier that identifies a vendor of a class of peripheral devices that includes the peripheral device, a namespace identifier that identifies a collection of types of peripheral devices that includes a type of the peripheral device, and a namespace entry identifier that identifies at least one of the type of the peripheral device or a particular functionality of peripheral devices that is a particular functionality of the peripheral device;
      generating, for the peripheral device, a peripheral device class identifier based on the vendor identifier, the namespace identifier, and the namespace entry identifier, the peripheral device class identifier identifying the class of peripheral devices, wherein the peripheral class identifier corresponds to multiple different peripheral devices within the class of peripheral devices without using product identifiers that distinguish between individual ones of the multiple different peripheral devices;
      using the peripheral device class identifier to identify a setup record for the peripheral device, the setup record being used for the class of peripheral devices; and
      using the setup record to set up the peripheral device for use on the computing device.

16. The computing device as recited in claim 15, the using the setup record to set up the peripheral device for use on the computing device comprising installing, on the computing device, a driver identified by the setup record.

17. The computing device as recited in claim 15, the peripheral device comprising a human interface device, the namespace identifier comprising a usage page identifier of the human interface device, the namespace entry identifier comprising a usage identifier of the human interface device, the generating the peripheral device class identifier comprising generating the peripheral device class identifier by concatenating the vendor identifier, the usage page identifier, and the usage identifier.

18. The computing device as recited in claim 15, the using the peripheral device class identifier to identify the setup record comprising identifying, as the setup record, one of multiple setup records on the computing device, the one of the multiple setup records including the peripheral device class identifier.

19. The method as recited in claim 6, the setup record including at least part of a driver to install on the computing device to allow the computing device to communicate with the peripheral device.

20. The method as recited in claim 1, the peripheral device class identifier corresponding to a collection of peripheral devices of a particular one of multiple vendors.

* * * * *